United States Patent
Gutierrez

(12) 
(10) Patent No.: US 7,377,387 B2
(45) Date of Patent: May 27, 2008

(54) STORED INFORMATION DISC RETRIEVAL

(76) Inventor: Andrez Gutierrez, 14831 Kittridge St., Van Nuys, CA (US) 91405

( * ) Notice: Subject to any disclaimer, the term of this patent is extended or adjusted under 35 U.S.C. 154(b) by 89 days.

(21) Appl. No.: 11/483,232

(22) Filed: Jul. 10, 2006

(65) Prior Publication Data

US 2008/0006545 A1    Jan. 10, 2008

(51) Int. Cl.
   *B65D 85/57*    (2006.01)
(52) U.S. Cl. ............... 206/308.1; 206/303; 206/445; 206/493; 206/804; 211/40
(58) Field of Classification Search ............ 206/232, 206/308.1, 307.1, 310, 303, 445, 493, 804; 211/40
See application file for complete search history.

(56) References Cited

U.S. PATENT DOCUMENTS

| | | | | |
|---|---|---|---|---|
| 6,406,214 | B1* | 6/2002 | Chene | 403/350 |
| 2003/0085139 | A1* | 5/2003 | Loritz | 206/308.1 |
| 2003/0188978 | A1* | 10/2003 | Ku | 206/308.1 |

* cited by examiner

*Primary Examiner*—Jacob K. Ackun, Jr.
(74) *Attorney, Agent, or Firm*—William W. Haefliger

(57) ABSTRACT

In a CD storage device, the combination comprising an upstanding post to receive CD's in a stack, and via openings therethrough, a carrier for each CD having circularly spaced retainers to retain the periphery of each CD at spaced locations, an identification zone associated with a retainer, for each CD, and cam surfaces on said carriers for interengagement in response to selected CD rotation, for locally elevating the carrier of a selected CD for retrieval off the post.

12 Claims, 3 Drawing Sheets

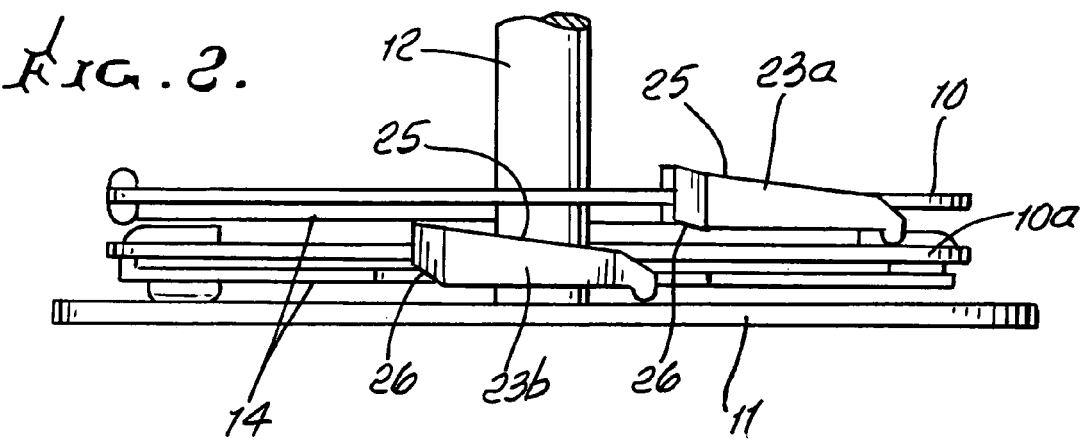
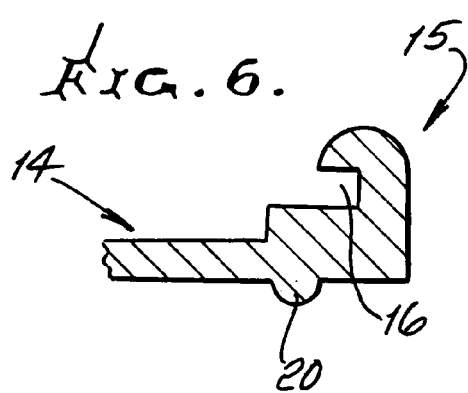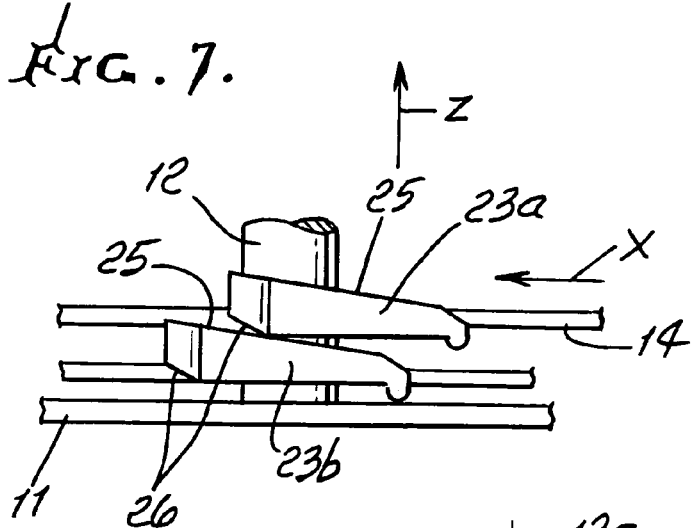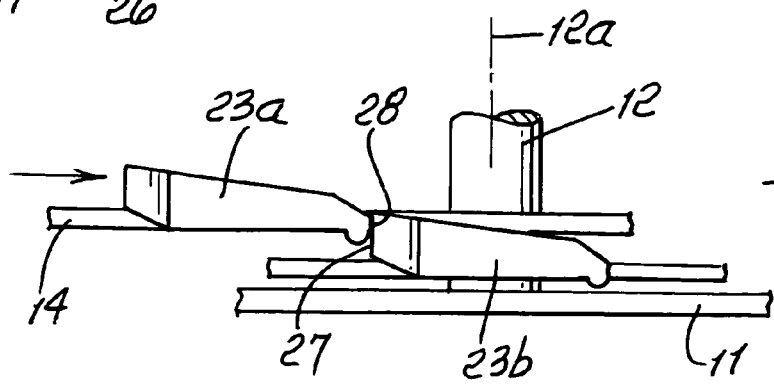

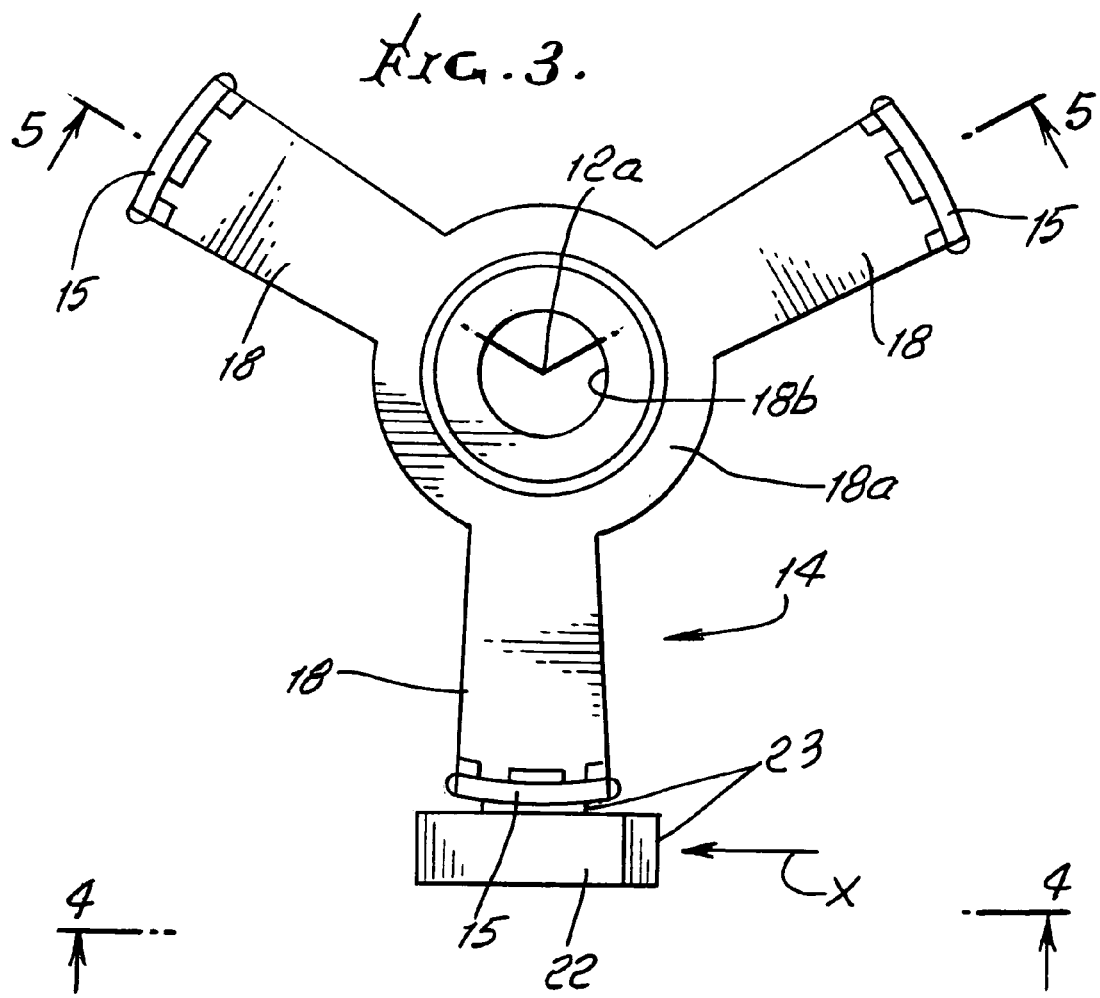
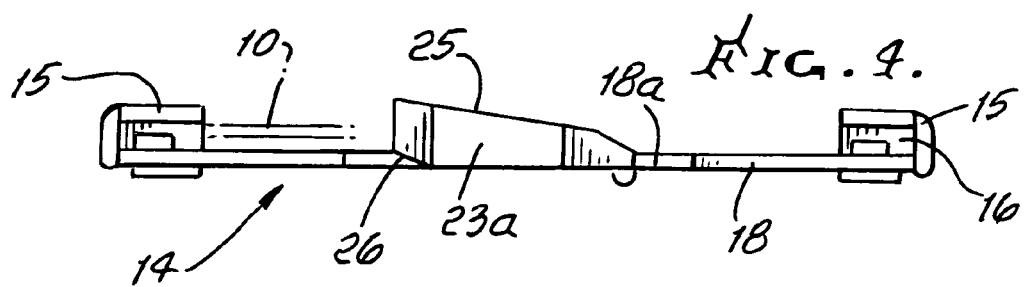
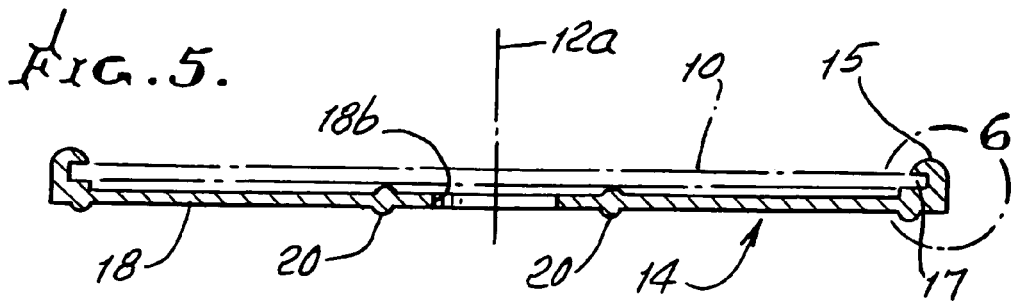

STORED INFORMATION DISC RETRIEVAL

BACKGROUND OF THE INVENTION

This invention relates generally to stack-storage of information discs, as for example compact discs, and more particularly it concerns facilitation of selected retrieval of such discs from stacked position.

When discs, such as compact discs (i.e. CD's) are stored in a stack, it becomes difficult to identify different discs in the stack, and it also becomes difficult to selectively retrieve them from the stack without destroying the stack organization. There is need for simple, easily usable, and efficient means for identifying discs in the stack, and for retrieving selected discs in the stack while retaining stack organization.

SUMMARY OF THE INVENTION

It is a major object of the invention to provide a solution to the above described problems and to meet the need referred to. Basically, the improved and preferred device of the invention comprises:

a) an upstanding post to receive CD's in a stack, and via openings therethrough, b) a carrier for each CD having circularly spaced retainers to retain the periphery of each CD at spaced locations, c) an identification (graphics) zone associated with a carrier, for each CD, d) and camming means on the carriers for interengagement in response to selected CD rotation, for locally elevating the carrier of a selected CD for retrieval off the post.

As will be seen, the identification zone is typically defined by or on a projection from the carrier, the projection extending relatively outwardly from the CD periphery, so that a series of such projections are formed by the stack, and are continued to interengage upon carrier relative rotation, whereby the projections define rotators for the different carriers.

Another object includes provision of camming surfaces on the projections, and may include facing upper and lower surfaces on the projections.

A further object includes provision of interengagement reverse rotation blocking elements on said projections.

Yet another object includes provision of carriers that have, generally, Y shape, with each carrier defining three arms spaced apart at approximately 120° intervals about an axis, the retainers located at arm terminals.

A further object includes provision of a method of manipulating the described device, with said a)-d) elements, employing the following steps:

e) rotating a selected carrier relative to other carriers, thereby to interengage the camming surfaces of said selected carrier and of the next adjacent carrier, for effecting elevation of the selected disc carrier, f) and lifting the selected carrier and CD thereon, off the post.

The method may typically include initially identifying the selected carrier by visual observation of its CD identifying identification zone.

Another step includes replacing on the post the CDs, that were elevated off the post, and their associated carriers.

These and other objects and advantages of the invention, as well as the details of an illustrative embodiment, will be more fully understood from the following specification and drawings, in which:

DRAWING DESCRIPTION

FIG. 2 is an elevation taken on lines 2-2 of FIG. 1;

FIG. 3 is a plan view of a disc carrier or holder;

FIG. 4 is an elevation taken on lines 4-4 of FIG. 3;

FIG. 5 is a section taken on lines 5-5 of FIG. 3;

FIG. 6 is an enlarged fragmentary section taken on lines 6-6 of FIG. 5;

FIG. 7 is a fragmentary section, taken in elevation to show interengaged camming elements on two of the carriers, as one carrier rotates forwardly;

FIG. 8 is a view like FIG. 7, but showing stop surface interengagement as the one carrier is rotated reversely.

DETAILED DESCRIPTION

Figure 1:
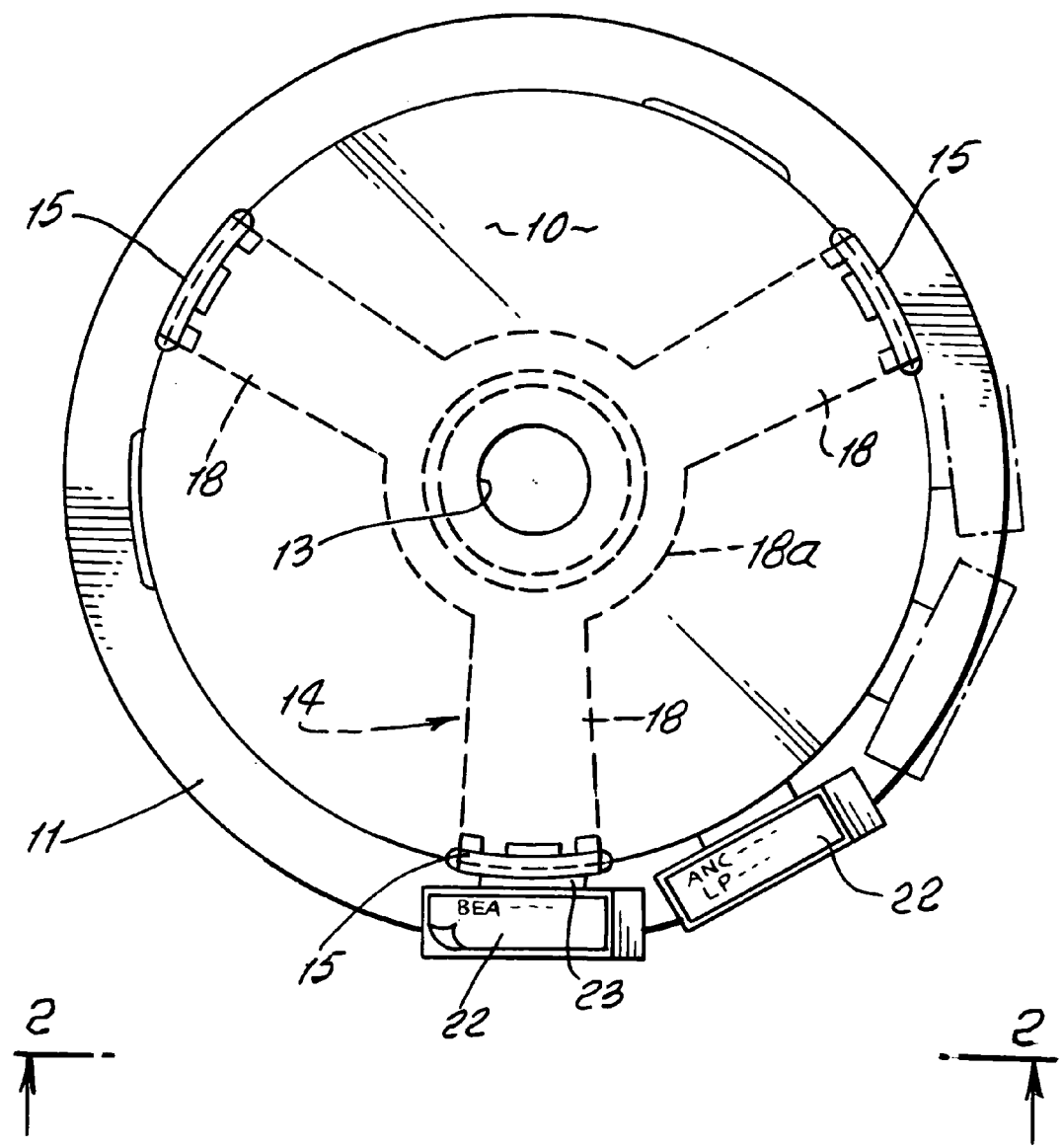
FIG. 1 is a plan view of a CD stack, with a carrier or holder shown in broken lines, beneath a carrier disc.

In FIGS. 1 and 2, two information (magnetic) carrying discs 10 and 10*a* are arranged in stacked relation on a base 11. A post 12 extends upwardly through a central opening 13 in each disc or CD, whereby the discs are centered for rotation. Associated with each disc is a carrier or holder 14 having retainers 15 with notches 16 to locally receive the disc periphery or outer edge 17. See FIG. 5. There are three such retainers located at the outer extents of three thin flat arms 18 of the carrier, the arms arranged in Y configuration, as by 120° spacing between the arms. A central hub 18*a* supports arms 18, and defines a central through opening 18*b*. Each carrier has lower arcuate projections 20 that ride on or rest on the surface of the next below CD.

As seen in FIG. 3, an identification zone 22 such as a label area is associated with one of the retainers of each carrier, and may be located on a projection 23 integral with one arm 18. Accordingly, a user may visibly observe a labeled zone and thereby identify the CD on that carrier. The projection 23 projection as in direction X seen in FIG. 3. Direction X is generally normal to the radial direction of arms 18.

Camming means is provided on the carriers for interengagement in response to selected CD rotation, for locally elevating the carrier of a selected CD, or well as carriers there above, for retrieval off the post. The camming means may comprise camming surfaces on the projection, such as upper and lower surfaces 25 and 26, seen in FIGS. 7 and 8, defining a wedge shape. When an upper projection 23*a* is rotated as in FIG. 7, its lower angled camming surface 26 engages the angled camming surface 25 of a next lower projection 23*b* causing projection 23*a* to be elevated in direction Z in FIG. 7. The user's fingers can exert force on 23*a* and 23*b* to effect selective motion in direction X and resulted motion in direction Z. This enables or facilitates manual elevation of projection 23*a* for manual retrieval of 18 upwardly off the carrier for an upper disc 10, relative to a lower disc or discs which remain in the stack.

The selected removed carrier, from which the upper disc is retrieved, can then be simply replaced on the stack, along with carriers and discs above the selected carrier.

FIG. 8 shows provision of interengagable reverse rotation blocking elements on the projections. See shoulder 27 on projection 23*b* engaged by shoulder 28 on projection 23*a*, blocking reverse rotation of 23*a* in direction Y. The axis of post 12 is seen at 12*a*.

The method of using the device includes:

$x_1$) rotating a selected carrier relative to other carriers, thereby to interengage the camming surfaces of said selected carrier and of the next adjacent carrier, for effecting elevation of the selected disc carrier, $x_2$) and lifting the selected carrier and CD thereon off the post.

The method typically also includes initially identifying the selected carrier by visual observation of its CD identifying identification zone. A further step includes replacing on the post the CDs that were elevated off the post, and their associated carriers.

I claim:

1. In a CD storage device, the combination comprising
   a) an upstanding post to receive CD's in the stack, and via openings therethrough,
   b) a carrier for each CD having circularly spaced retainers to retain the periphery of each CD at spaced locations,
   c) an identification zone associated with a carrier, for each CD, and
   d) a camming means on said carriers for interengagement in response to selected CD rotation, for locally elevating the carrier of a selected CD for retrieval off the post.

2. The combination of claim 1 wherein said zone is defined on a projection for the carrier, said projection extending outwardly from the CD periphery.

3. The combination of claim 2 wherein said projection define a CD rotator.

4. The combination of claim 2 wherein said camming means comprises camming surfaces on the projections.

5. The combination of claim 4 wherein said camming surfaces are facing upper and lower surfaces on the projection.

6. The combination of claim 4 including interengagable reverse rotation blocking elements on said projection.

7. The combination of claim 1 wherein said carrier has Y shape.

8. The combination of claim 1 wherein said carrier has three arms spaced apart at approximately 120° intervals about an axis, the retainers located at arm terminals.

9. The combination of claim 1 including the discs, and wherein the retainers define channels to receive peripheral portions of each disc.

10. The method of using the device of claim 1 that includes:
    e) rotating a selected carrier relative to other carriers, thereby to interengage the camming surfaces of said selected carrier and of the next adjacent carrier, for effecting local elevation of the selected disc carrier,
    f) and lifting the selected and locally elevated carrier and CD thereon, off the post.

11. The method of claim 10 including initially identifying the selected carrier by visual observation of its CD identifying identification zone.

12. The method of claim 11 including replacing on the post the CDs that were elevated off the post, and their associated carriers.

* * * * *